United States Patent
Forman

(10) Patent No.: US 7,558,766 B1
(45) Date of Patent: Jul. 7, 2009

(54) CLASSIFICATION USING ENHANCED FEATURE SETS

(75) Inventor: George Henry Forman, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 362 days.

(21) Appl. No.: 11/536,643

(22) Filed: Sep. 29, 2006

(51) Int. Cl.
*G06E 1/00* (2006.01)
*G06E 3/00* (2006.01)
*G06F 15/18* (2006.01)
*G06G 7/00* (2006.01)

(52) U.S. Cl. ...................................................... 706/20
(58) Field of Classification Search ............... 706/20
See application file for complete search history.

(56) References Cited

U.S. PATENT DOCUMENTS

| | | | |
|---|---|---|---|
| 5,444,820 A | 8/1995 | Tzes et al. | |
| 5,675,710 A | 10/1997 | Lewis | |
| 6,161,130 A * | 12/2000 | Horvitz et al. | 709/206 |
| 6,701,333 B2 * | 3/2004 | Suermondt et al. | 707/204 |
| 6,947,936 B1 * | 9/2005 | Suermondt et al. | 707/7 |
| 7,188,050 B2 * | 3/2007 | Yuan et al. | 702/183 |
| 7,200,604 B2 * | 4/2007 | Forman et al. | 707/101 |
| 7,263,486 B1 * | 8/2007 | Hakkani-Tur et al. | 704/243 |
| 7,272,945 B2 * | 9/2007 | Bash et al. | 62/180 |
| 7,318,051 B2 * | 1/2008 | Weston et al. | 706/12 |
| 7,349,917 B2 * | 3/2008 | Forman et al. | 707/102 |
| 7,370,021 B2 * | 5/2008 | Reeve et al. | 706/16 |
| 7,406,452 B2 * | 7/2008 | Forman et al. | 706/20 |
| 7,415,445 B2 * | 8/2008 | Forman | 706/20 |
| 7,475,048 B2 * | 1/2009 | Weston et al. | 706/20 |
| 7,502,767 B1 * | 3/2009 | Forman et al. | 706/20 |

OTHER PUBLICATIONS

Extension Classified Prediction Used in Predicting Monthly Average Temperature of Cities Yang Yuanyuan; Zeng Tao; Yu Yongquan; Computer and Electrical Engineering, 2008. ICCEE 2008. International Conference on Dec. 20-22, 2008 pp. 674-677 Digital Object Identifier 10.1109/ICCEE.2008.22.*

A distributed implementation of fuzzy clustering and switching of linear regression models for lossless compression of imagery and 3D data Aiazzi, B.; Alba, P.; Alparone, L.; Baronti, S.; Lotti, F.; Mattei, A.; Multimedia Signal Processing, 1998 IEEE Second Workshop on Dec. 7-9, 1998 pp. 382-387 Digital Object Identifier 10.1109/MMSP.1998.738.*

(Continued)

*Primary Examiner*—Michael B Holmes

(57) ABSTRACT

Provided are systems, methods and techniques for classifying items. According to one preferred embodiment, initial feature sets are obtained for a current batch of items, and classification predictions are generated for the items based on their initial feature sets, using a set of existing classifiers. The classification predictions are then appended as additional features to the respective feature sets of the items, thereby obtaining enhanced feature sets, and a first classifier is trained, using a plurality of the items as training samples and using the enhanced feature sets of the training samples. Finally, items in the current batch are classified using their enhanced feature sets and the first classifier. According to this embodiment, the existing classifiers were trained on a plurality of different sets of items that are representative of corresponding different times.

24 Claims, 5 Drawing Sheets

OTHER PUBLICATIONS

Fuzzy handling of uncertainty in industrial recycling Karlsson, B.; Instrumentation and Measurement Technology Conference, 1998. IMTC/98. Conference Proceedings. IEEE vol. 2, May 18-21, 1998 pp. 832-836 vol. 2 Digital Object Identifier 10.1109/IMTC.1998.676842.*

Klinkenberg, Ralf and Rüping, Stefan. Concept Drift and the Importance of Examples. In Franke, Jürgen and Nakhaeizadeh, Gholamreza and Renz, Ingrid (editors), Text Mining—Theoretical Aspects and Applications, pp. 55-77, Berlin, Germany, Physica-Verlag.

Gaber, M. M., Zaslavsky, A., and Krishnaswamy, S. 2005. Mining data streams: a review. SIGMOD Rec. 34, 2 (Jun. 2005), 18-26.

Hulten, G., Spencer, L., and Domingos, P. 2001. Mining time-changing data streams. In Proceedings of the Seventh ACM SIGKDD international Conference on Knowledge Discovery and Data Mining (San Francisco, California, Aug. 26-29, 2001). KDD '01.

Evgeniy Gabrilovich and Shaul Markovitch. Feature Generation for Text Categorization Using World Knowledge. In Proceedings of The Nineteenth International Joint Conference for Artificial Intelligence, pp. 1048-1053, Edinburgh, Scotland, 2005.

Eric Bauer and Ron Kohavi, An Empirical Comparison of Voting Classification Algorithms: Bagging, Boosting, and Variants. Machine Learning, vol. 36, Nos. 1-2 / Jul. 1999, 105-139.

* cited by examiner

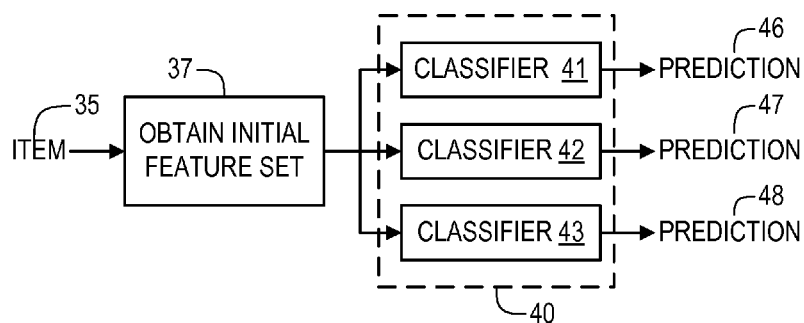
FIG. 2
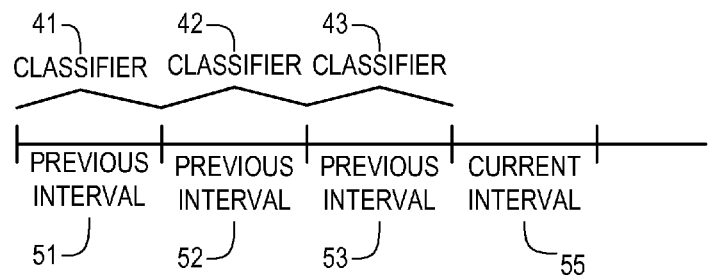
FIG. 3
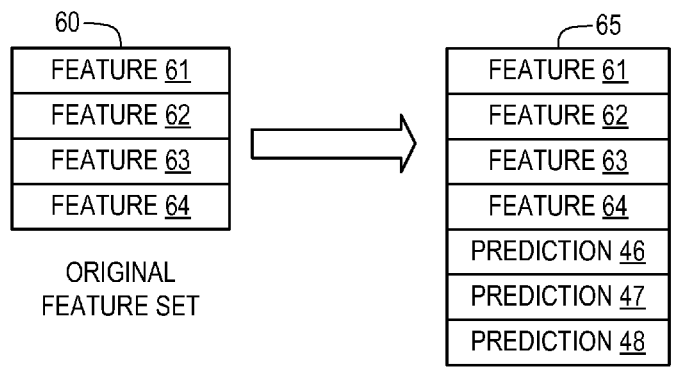
FIG. 4A — ORIGINAL FEATURE SET
FIG. 4B — ENHANCED FEATURE SET

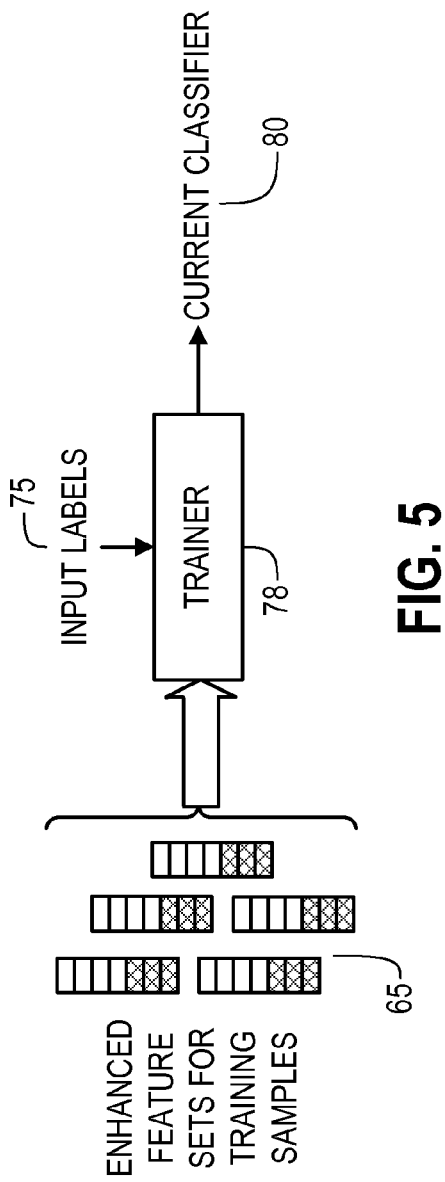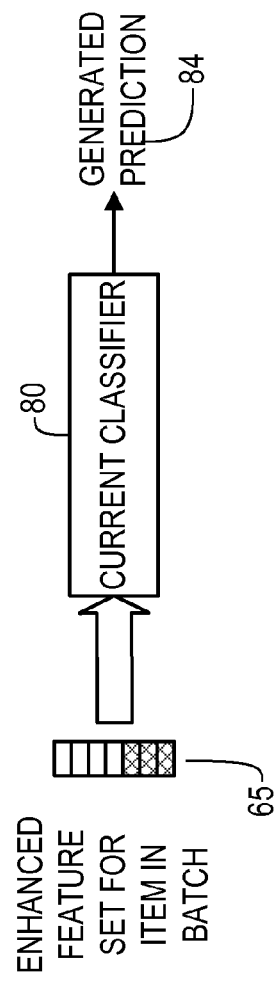

CLASSIFICATION USING ENHANCED FEATURE SETS

FIELD OF THE INVENTION

The present invention pertains to systems, methods and techniques for automatically or semi-automatically classifying items based on their associated feature sets, and is applicable to classifying any of a variety of items, such as documents containing text, images, audio, video or any combination of such elements.

BACKGROUND

A great deal of attention has been given to automated machine-learning techniques. However, there are a number of situations in which conventional machine-learning techniques are inadequate. One such situation occurs when items are to be classified into categories and the content of the items and/or the category definitions vary significantly over time. This problem often is referred to as "concept drift". An example is where one wishes to employ an automated process for the purpose of classifying news articles (perhaps thousands of new articles each day) into various topic areas based on the text content of the articles.

While a number of approaches have been taken to address this problem, additional improvements in performance would be beneficial.

BRIEF DESCRIPTION OF THE DRAWINGS

FIG. 2 is a block diagram showing the generation of classification predictions using a set of existing classifiers, according to a representative embodiment of the present invention;

FIG. 3 illustrates a timeline, showing different time intervals during which different batches of items were collected or generated, according to a representative embodiment of the present invention;

FIGS. 4A and 4B together illustrate the appending of predictions to an initial feature set (shown in FIG. 4A) in order to obtain an enhanced feature set (shown in FIG. 4B), according to a representative embodiment of the present invention;

FIG. 5 is a block diagram illustrating the creation of a current classifier based on training samples having an enhanced feature set, according to a representative embodiment of the present invention;

FIG. 6 is a block diagram illustrating the use of a current classifier for generating classification predictions for items in a batch, according to a representative embodiment of the present invention;

DESCRIPTION OF THE PREFERRED EMBODIMENT(S)

First Representative Embodiment

Figure 1:
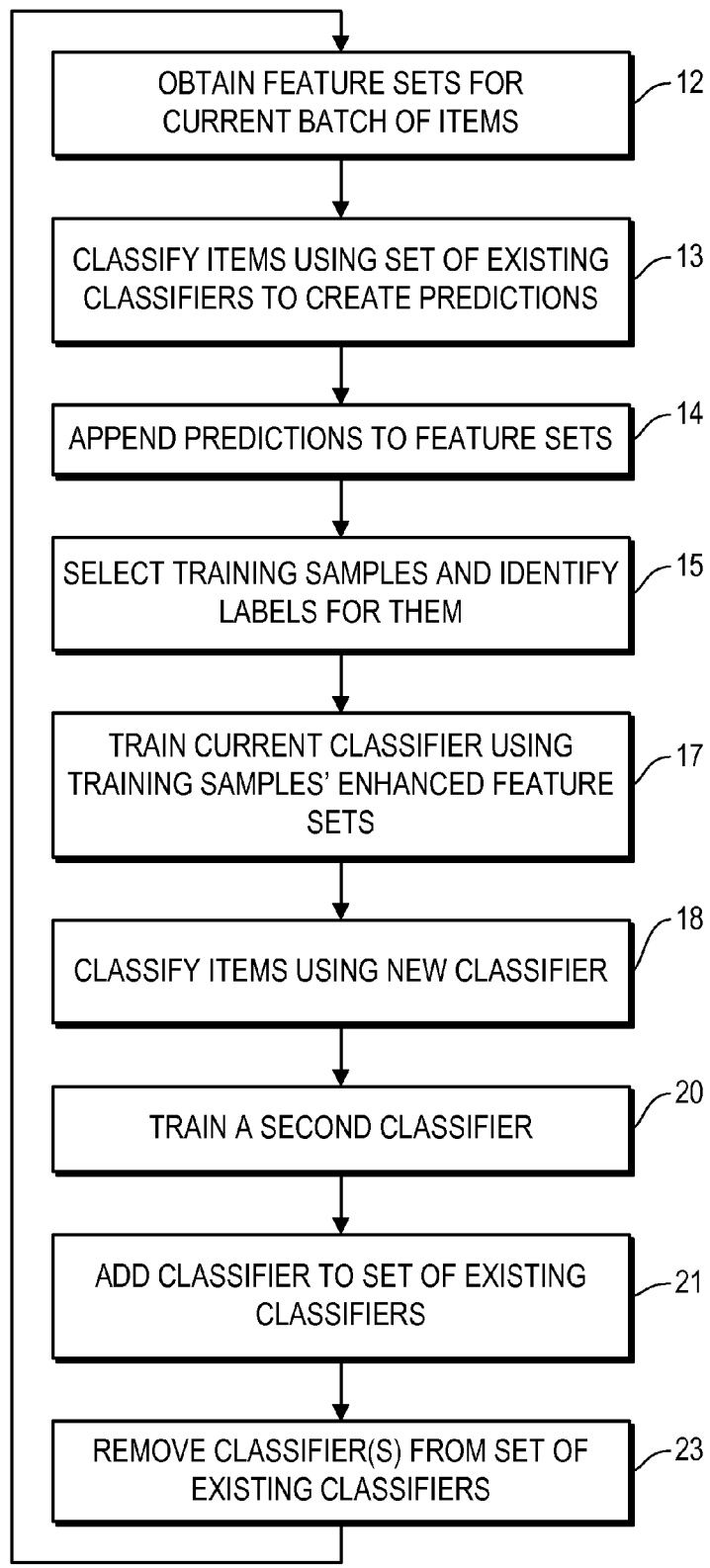
FIG. 1 illustrates a flow diagram for classifying items according to a first representative of embodiment of the present invention.

FIG. 1 illustrates a flow diagram of a process for classifying items according to a first representative embodiment of the present invention. Generally speaking, this embodiment assumes that the items to be classified are received on an ongoing basis over time. For purposes of this embodiment, such items are divided into and then processed in batches, with each batch corresponding to a different, preferably non-overlapping, time segment.

Initially, in step 12 initial feature sets are obtained for a batch of items (e.g., either by processing the items internally in order to generate such feature sets or by inputting such feature sets from an external source). In one example, the process is intended to classify news articles, and the current batch of items that is obtained corresponds to all news articles that have been published during the current day by the various publications and other sources that are being monitored by the present process. For this example, the feature set (or feature vector) preferably comprises conventional "bag-of-words" features, although any other feature set instead can be used.

In other situations, the individual items might correspond to other textual works, images, documents that include any combination of images and text, sound files, video files, signals representative of any physical phenomenon, or any other items that one wishes to classify or categorize. In any event, the items in the current batch preferably are all of a similar type (e.g., all are news articles or all are images).

Preferably, the initial feature set for each item characterizes that item in some manner, e.g., by summarizing the content of the item. The use of such feature sets is well-known in the prior art and therefore is not discussed in detail here. Generally speaking, such feature sets (if appropriately chosen) can provide the basis for classifying the items. In the preferred embodiments, the feature sets for the different items all have the same format or parameters, with only the values of those parameters varying from item to item. The specific format or design of the feature set for the items preferably depends upon the specific type of the items and, more preferably, is designed in conjunction with the classifiers that are to operate on them. The considerations pertaining to such designs as well as specific design solutions also are discussed in the prior art.

In step 13, referring to FIG. 2, each item 35 in the current batch is classified by obtaining 37 its feature set and then executing each classifier in a set 40 of existing classifiers 41-43 on such feature set, thereby producing corresponding classification predictions 46-48. Such predictions preferably are intended to predict the ground truth label that would be identified for the corresponding item if the item were to be classified manually. In the present embodiment, the "ground truth label" (sometimes referred to herein simply as the label) represents the specific category (hard label) into which the specific item should be placed, e.g., when classifying articles, either: government and social issues, sports or economics. In other embodiments, the labels represent category scores, indicating how well the item fits into particular categories; for example, a single article could have a government and social issues score of 0.4 and a sports score of 0.5.

Although only three classifiers are shown in FIG. 2, it should be understood that this is for ease of illustration only, and there generally can be many more such classifiers (e.g., more than 20, 50, 100, 300, 500 or 1,000), with a corresponding number of output classification predictions.

Depending upon the particular embodiment, the classification predictions (e.g., predictions 46-48) either identify particular categories to which the corresponding item should be assigned (sometimes referred to as hard classification predictions) or else constitute classification scores which indicate how closely related the items are to particular categories (sometimes referred to as soft classification predictions);

such a soft classification prediction preferably represents the probability that the corresponding item belongs to a particular category. It is noted that either hard or soft classification predictions can be generated irrespective of whether the ground truth labels are hard labels or soft labels, although often the predictions and labels will be of the same type.

As discussed in more detail below, each such existing classifier preferably was trained using items from a different previous point or interval in time. This concept is illustrated in FIG. 3, in which the three classifiers 41-43 were trained using items from the three consecutive time intervals 51-53, respectively, that immediately preceded the current time interval 55. More generally, the time intervals over which they are trained can overlap; e.g., classifier 42 can instead have been trained from intervals 51 and 52 together.

Next, returning to FIG. 1, in step 14 the newly generated classification predictions 46-48 are appended to the feature sets for the items in the current batch. This step is illustrated in FIGS. 4A and 4B. More specifically, FIG. 4A shows the initial feature set 60 for one of the items in the current batch. Although the initial feature set 60 is shown as including only four features, features 61-64, this again is only for ease of illustration. Ordinarily, the initial feature set 60 will include tens, hundreds or even thousands of features. In FIG. 4B, predictions 46-48 have been appended (as additional features) to initial feature set 60 in order to produce enhanced feature set 65.

Returning again to FIG. 1, in step 15 training samples are randomly selected from the current batch, and labels are identified for them. For example, with respect to the problem of classifying news articles, 100 of the current day's articles preferably are selected to be training samples.

Nearly all portions of the present technique (including selection of the training samples) can be, and preferably are, performed automatically (e.g., using a computer software program). However, the identification of labels for the training samples in this step 15 generally is performed manually and the resulting labels then are input into the software program. For example, with respect to the exemplary problem mentioned above in which news articles are classified, one or more individuals typically will read the articles and then assign them labels of the appropriate categories.

In step 17, referring to FIG. 5, the enhanced feature sets 65 for the training samples selected in step 15 and the labels 75 identified in step 15 are input into an automated training process 78 in order to generate a current classifier 80. Trainer 78 implements any desired (e.g., conventional) classifier learning algorithm, such as Naïve Bayes, C4.5 decision trees or support vector machine (SVM). Essentially, all such algorithms try to find an optimal (according to some underlying criteria) mapping from the supplied feature sets to the corresponding identified classification labels, so that the resulting classifier can receive new unlabeled items and provide a classification label based on its best guess in view of the item's feature set. As should be apparent, classifier 80 operates on an enhanced feature set in order to generate a classification prediction for the corresponding input item.

In step 18, referring to FIG. 6, an unlabeled item in the current batch is classified by the current classifier 80, which processes the item's enhanced feature set 65 (which in turn was generated by applying classifiers 41-43 to the initial feature set 60 of the item). As a result, a classification prediction 84 is generated for the item. In the preferred embodiments, this step 18 is performed for each item in the current batch other than the training samples, for which labels were identified in step 15. These classification predictions 84 preferably are then used as the current output classification predictions for the items in the current batch.

Ordinarily, the substantial majority of the items in the current batch will have been classified using the current classifier 80 (rather than the labels identified in step 15). While the techniques of the present invention often will improve the accuracy of such classifications, as compared with conventional classification techniques, there almost certainly will be some errors in the classifications. Over time, some of these classification errors will be discovered (e.g., manually) and the correct classification labels will be identified for at least some of the items in the batch. As discussed in more detail below, in some embodiments classifier predictions that are later reviewed and not corrected by users are deemed to be correct predictions and therefore treated as ground truth labels.

Figure 7:
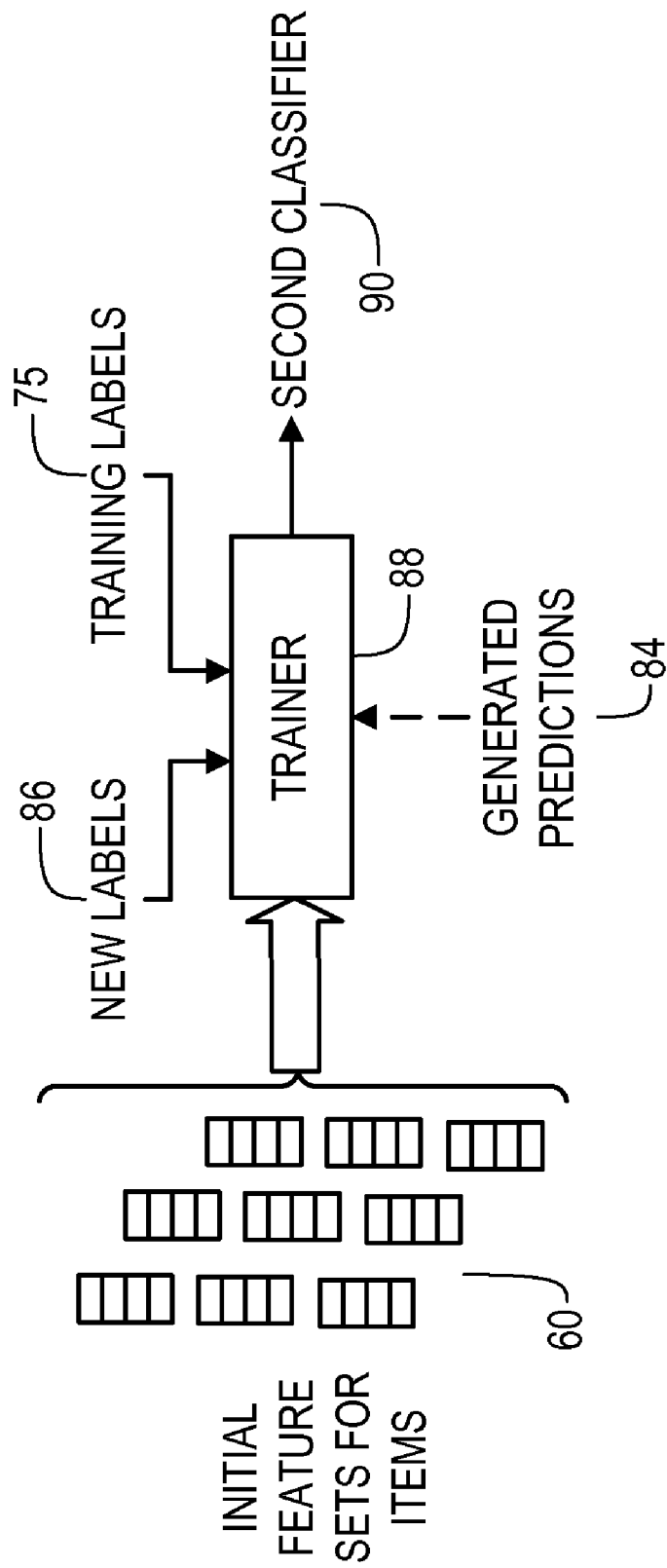
FIG. 7 illustrates the generation of a second classifier according to a representative embodiment of the present invention.

Accordingly, in step 20 (referring to FIG. 7) such newly identified classification labels 86, the original training labels 75 and the initial feature sets 60 for the corresponding items are input into a trainer 88 in order to generate a second classifier 90. In certain embodiments of the invention, only the items that originally were training samples or that subsequently (i.e., after completion of the classifications in step 18) had a label identified for them are input into trainer 88; in such cases, the input items preferably include both items for which the classification in step 18 subsequently proved to be incorrect and items for which the classification in step 18 subsequently was confirmed. It is noted that even the classifications that originally were assigned to the training samples (in step 15) subsequently might change based, e.g., on redefinitions of the applicable categories or changes in the way particular items are perceived.

In alternate embodiments of the invention, all or substantially all of the items within the batch are included as training samples input into trainer 88. Preferably, if labels have been identified for any of the items (either in step 15 or subsequent to step 18), such identified labels are used. Otherwise, the predictions 84 that were generated in step 18 are used. The effect of this approach is a type of semi-supervised learning, and it often can be justified because: (i) the classifications for properly classified items often will not be explicitly confirmed (i.e., only the improperly classified items typically will be brought to someone's attention), so after the passage of time it often is reasonable to assume that some percentage of the classifications made in step 18 implicitly have been confirmed; and (ii) aside from any implicit confirmation, the generated predictions 84 were based on an enhanced feature set and therefore are presumably fairly accurate.

In any event, it is noted that the generated second classifier 90 preferably operates on the initial (unenhanced) feature set 60. Generally speaking, such a classifier depends only on the features of the particular item under consideration and not on historical classifications. Certain benefits of this property are discussed below.

In still further embodiments of the invention, second classifier 90, at least sometimes, is generated without access to any new labels 86. An advantage of doing so is that one could have immediate access to a classifier that depends only on the initial (unenhanced) feature set 60 without having to wait for identification of new labels 86. In such a case, the predictions 84 generated based on the enhanced feature sets preferably are used, so that the resulting process again involves semi-supervised learning.

Referring again back to FIG. 1, in step 21 a classifier is added to the set 40 of existing classifiers. Preferably, this new classifier is the second classifier 90 that was generated in step 20. As indicated above, like the other existing classifiers 46-48, classifier 90 preferably operates only on the initial (unenhanced) feature set 60. Accordingly, its application generally will not require access to previous classification predictions.

However, in alternate embodiments of the invention the new classifier added to the set 40 of existing classifiers in this step 21 is the current classifier 80 that was generated in step 17 (in which case step 20 generally can be omitted, because second classifier 90 likely is unnecessary). In still further embodiments, the added classifier is a newly generated classifier that is trained against the enhanced feature sets 65 (similar to the generation of current classifier 80) but also using labels 86 that were subsequently identified (similar to the preferred generation of second classifier 90).

In either of the foregoing two cases, the classifier operates against an enhanced feature set 65 that includes classification predictions predicted by classifiers trained on previous data. The overall effect of using a set 40 of existing classifiers that operate on such enhanced feature sets 65 is a recurrent dependency (i.e., a classifier depends on one or more previous classifiers, which in turn depend on one or more previous classifiers, and so on). Such recurrent dependency at least theoretically implies that any given classifier can never be retired. However, in practical applications it is possible to build in a decay factor so that the influence of a classifier trained some specified period of time in the past can be assumed to be zero. Nevertheless, there often will be computational advantages in using a classifier that only depends upon the initial feature set 60.

Finally, in step 23 one or more classifiers is removed from the set 40 of existing classifiers. This step prevents the set 40 from becoming too large, but can be omitted (resulting in the use of all previously generated classifiers for the purpose of enhancing the initial feature set 60) if the attendant storage requirements and processing load are not significant issues.

In one embodiment of the invention, when the current classifier is added in step 21, if the set 40 now exceeds some maximum size, e.g., 365 or any other (predetermined or dynamically determined) number, the oldest classifier (i.e., the one trained on the oldest batch of items) automatically is removed from the set 40. Moreover, in certain sub-embodiments, certain classifiers in the set 40 are allowed to depend on some or all of their predecessors, but (e.g., in order to avoid the necessity of saving classifiers indefinitely) the oldest classifier in the set 40 is constrained to depend only on unenhanced features (e.g., initial feature set 60). In these sub-embodiments, each time a classifier is removed from the set 40, the remaining oldest classifier preferably is retrained to depend only on unenhanced features. In still further sub-embodiments, the antecedents for the remaining oldest classifier also are retrained, in order to adjust for the change.

In another embodiment, the classifiers 41-43 in set 40 are evaluated for their prediction accuracy (e.g., with respect to the current batch of items or across the last N batches of items processed), and the classifier having the least predictive value (e.g., according to well-known feature selection methods in the art) automatically is eliminated from the set 40.

Upon completion of step 23, processing returns to step 12 to process the next batch of items (e.g., the items generated or collected during the next day).

Although the foregoing process steps are shown and described as occurring in a particular order, it should be understood that variations are possible, and the described sequence therefore should be understood as being exemplary only. For example, classifiers can be pruned from the set 40 of existing classifiers (in step 23) at any point during the process. Similarly, new classifiers can be added into the set 40 (in step 21) at any point during the process.

Basically, the foregoing technique augments the feature sets for the items in a current batch with predictions made by P previous classifiers. Those predictions are treated in the preferred embodiments simply as P additional features of the feature set.

These additional P features potentially are predictive in the current learning task. For example, in the news article classification problem, assuming the previous P classifiers correspond to the previous days, then if a news theme recurs that was popular within the past P days, the current classifier 80 might be able to leverage the predictions made by the old classifiers that were trained while the theme was previously popular. This suggests some pressure to maximize P for greater long-term memory, if the system implementing the foregoing process can afford the computational cost. However, it is noted that the application of old classifiers generally is much faster than their original training. Even if P were as high as 364 days, such additional features are still dwarfed by the large number of bag-of-words features generated by the training sets.

Now, if some or all of the P features end up being worthless with regard to the current learning task, then the state-of-the-art classifier will be able to ignore them, just as conventional classifiers are easily able to ignore a large number of non-predictive features in a feature set. However, in many cases at least one of the additional P features will turn out to have significant predictive value in connection with the current learning task.

The present inventor conducted a series of daily classification task experiments for the purpose of classifying Reuters news articles into each of a number of different categories, focusing on the binary classification task of predicting which of each day's news articles belong to each of the four topic areas, using a random sampling of 400 articles from each day, with T=100 of those selected to be training cases. The base classifier used was a linear support vector machine (SVM) trained on binary bag-of-words features (title+body text lowercased, alpha only, max 50,000 words from each training set), as implemented by the WEKA v3.4 library, with BNS feature scaling and no feature selection. This classifier was chosen for its performance and for its ability to tolerate many non-predictive features. The features to create the enhanced feature sets 65 were binary predictions.

The results showed substantial improvements over conventional techniques, particularly when using P=128 days of the previous classifiers, each of which having been trained against 100% of the articles in its corresponding batch (all 400 as opposed to only the 100 training samples). Even when the "hindsight learning" was reduced to 25% (additional labels subsequently were identified for 25% of the 300 non-training samples), it was discovered that most of the benefit of 100% hindsight learning was retained. However, it should be noted that all of the improvements varied based on the particular categories, with prior learning apparently being more predictive for some categories than for others.

Variations on the embodiment described above are possible. For example, in one representative embodiment, in addition to adding and pruning classifiers as described above, a classifier in set 40 for a previous batch of items automatically is replaced by a replacement classifier (e.g., generated according to step 20) whenever a sufficient number of new labels 86 have been identified for the items in such batch. That is, the existing classifiers 41-43 are updated on an ongoing basis to reflect the most recent knowledge.

In this regard, experimental results have indicated that accuracy can be significantly improved by training the classifiers 41-43 on a larger number of items that have correctly identified classification labels. Another technique for achieving this goal is to delay the addition of a classifier to the set 40 (e.g., the performance of steps 20 and 21) until a sufficient number of classification labels have been identified for items in the subject batch.

Second Representative Embodiment

Figure 8:
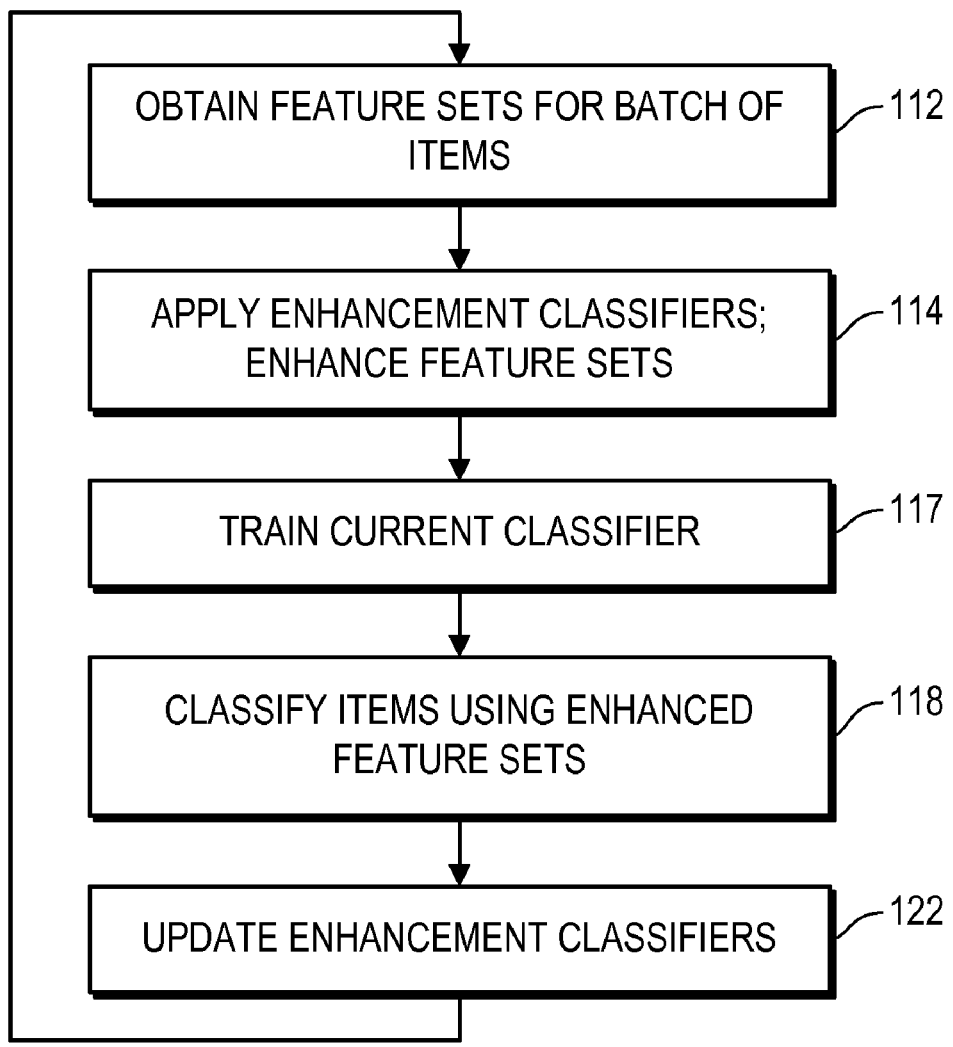
FIG. 8 illustrates a flow diagram for classifying items according to a second representative embodiment of the present invention.

FIG. 8 illustrates a flow diagram for explaining how to classify items according to a second representative of embodiment of the present invention. The concepts underlying the present embodiment generally are the same as those underlying the embodiment discussed above, although the approach is somewhat different.

Initially, in step 112 feature sets are obtained for items in an identified batch. This step, as well as the considerations pertaining to it, are similar to step 12, discussed above. In the present embodiment, the batch obtained is distinguished from other batches by one or more parameter values.

For example, in one representative sub-embodiment, the parameter is time (e.g., such that the present batch was collected or generated during a different time interval than other batches). In another representative sub-embodiment, the parameter is source (e.g., where the present batch was generated by a different source than other batches). In still further representative sub-embodiments, multiple different parameters are used to distinguish different batches, with the resulting multi-dimensional space being divided in any desired manner.

In step 114, one or more enhancement classifiers are applied to the feature set for each item in the batch presently being processed. Each of such enhancement classifiers preferably corresponds to a different portion (e.g., non-overlapping) of the (single or multiple) parameter space. The resulting classification predictions for each item in the present batch are then used to modify or enhance the initial feature set for such item (e.g., by simply appending such classification predictions as additional features). The result is to provide an enhanced feature set for such item.

In step 117, a current classifier is trained based on the items in the current batch. As was the case in step 17 (discussed above), the current classifier preferably uses the enhanced feature sets for a plurality of the items that are selected (e.g., randomly selected) as training samples. The considerations discussed above in connection with step 17 generally also apply to this step 117.

In step 118, all of the items in the current batch are classified using their enhanced feature sets and using the current classifier that was generated in step 117. This step is similar to step 18, discussed above, and all of the same considerations generally apply.

Finally, in step 122 the enhancement classifiers are updated. In the various sub-embodiments, this involves any or all of: (i) replacing an enhancement classifier for a particular batch (e.g., a classifier that has had relatively poor predictive accuracy, which generally means that it produces predictions having insufficient aggregate positive or negative correlations with the actual ground truth labels) with a classifier for a different batch; (ii) adding a new classifier (e.g., a classifier trained on items from a batch not currently represented within the set) to the set of enhancement classifiers; (iii) eliminating an existing enhancement classifier (e.g., a classifier that has had relatively poor predictive accuracy); and (iv) replacing an existing enhancement classifier for a given batch with a new enhancement classifier for the same batch (e.g., with the replacement classifier having been trained on a larger group of items whose classification labels have been identified).

Upon completion of step 122, the process returns to step 112 to begin processing the next batch. Although step 122 is shown as the last process step in the overall process for a particular batch, such placement is for ease of illustration only. It should be understood that step 122 preferably is performed on an ongoing basis as new information justifies it, e.g., as classification labels for existing items are identified or as determinations are made regarding relative predictive accuracies of different classifiers.

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks (e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks); a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

Generally speaking, in the embodiments described above classification predictions are generated using feature sets that have been enhanced using classifications generated from a set of classifiers that, in turn, were trained using data from other batches. In addition, a variety of other techniques are disclosed for improving the results that can be obtained using this general technique. One of such techniques is to delay adding a new classifier until a sufficient number of additional new classification labels have been identified for items in the subject batch. Another is to add classifiers immediately, but then update them on an ongoing basis as new classification labels are identified.

In either case, the set of enhancement classifiers changes over time. In addition to using the current set of enhancement classifiers to process a new batch of items, existing batches of items preferably are reprocessed from time to time using the most current set of enhancement classifiers. As a result, improved accuracy often can be achieved.

Also, in the embodiments described above each enhancement classifier generally is described as being used to generate a single classification prediction that is appended to the initial feature set for a subject item. However, in alternate embodiments the individual classifications produced by such enhancement classifiers are combined with each other or with one or more features from the initial feature set (e.g., in a nonlinear manner), so as to produce a "composite" additional feature, which is then appended to the initial feature set. Similarly, the initial feature set can be modified in any desired linear or nonlinear manner (in order to generate the enhanced feature set) based on the classifications made by the enhancement classifiers.

As indicated above, the set of enhancement classifiers can be generated based on overlapping or non-overlapping spaces in time or in any other single-dimensional or multi-dimensional parameter space. Moreover, such enhancement classifiers can be dependent upon only the particular items in the then-current batch or can be dependent upon predictions from classifiers trained on items in other batches (with the latter approach often resulting in a recursive computation and a potentially unlimited number of enhancement classifiers).

It also is noted above that different types of classifiers may be utilized. More specifically, the set of enhancement classifiers can include different types of classifiers, and any or all of those may differ from the type of classifier used for the current batch.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of classifying items, comprising:
   (a) obtaining initial feature sets for a current batch of items;
   (b) generating classification predictions for the items based on the initial feature sets for the items, using a set of existing classifiers;
   (c) appending the classification predictions as additional features to the respective feature sets of the items, thereby obtaining enhanced feature sets;
   (d) training a first classifier, using a plurality of the items as training samples and using the enhanced feature sets of the training samples; and
   (e) classifying items in the current batch using the enhanced feature sets of the items and the first classifier,
   wherein at least one of the existing classifiers was trained on a different set of items that are representative of a corresponding different time, and
   wherein steps (a)-(e) are executed by one or more computers.

2. A method according to claim 1, further comprising:
   (f) training a second classifier using the initial feature sets, without enhancement, for the items in the current batch; and
   (g) adding the second classifier to the plurality of existing classifiers.

3. A method according to claim 2, wherein the second classifier is trained on a larger subset of the items than was used to train the first classifier.

4. A method according to claim 2, wherein the first classifier generates new classification predictions in step (e), and wherein the second classifier is trained by assuming that at least one of the new classification predictions is usable in training as a ground truth label.

5. A method according to claim 1, further comprising steps of repeatedly obtaining additional batches of items that have corresponding feature sets, and repeating steps (b)-(e) for said additional batches.

6. A method according to claim 1, further comprising a step of periodically eliminating a selected classifier from the set of existing classifiers.

7. A method according to claim 6, wherein each time the selected classifier is a classifier that was trained on an older batch of items.

8. A method according to claim 6, wherein the selected classifier is chosen based on its relative predictive power.

9. A method according to claim 1, wherein the existing classifiers were trained with respect to different batches of items collected during non-overlapping time intervals.

10. A method according to claim 1, wherein the classifiers classify items into discrete categories.

11. A method according to claim 1, wherein the classifiers generate classification scores indicating how closely related the items are to particular categories.

12. A method according to claim 1, further comprising:
(f) adding the first classifier to the set of existing classifiers; and
(g) using the first classifier, together with other ones of the existing classifiers, to generate enhanced feature sets for additional batches of items.

13. A method of classifying items, comprising:
(a) obtaining initial feature sets for a batch of items;
(b) enhancing the feature sets with predictions made using a set of classifiers that were generated from data having corresponding different values for at least one specified parameter;
(c) training a current classifier using a plurality of the items as training samples and using the enhanced feature sets for the training samples;
(d) classifying items in the batch using their enhanced feature sets and the current classifier;
(e) repeating steps (a)-(d) a plurality of times; and
(f) updating the set of classifiers over time as new classification labels are identified,
wherein steps (a)-(f) are performed by one or more computers.

14. A method according to claim 13, wherein the at least one specified parameter comprises time.

15. A method according to claim 13, wherein updating the set of classifiers comprises at least one of: (i) replacing an existing classifier in the set for a particular batch having relatively poor predictive accuracy with a classifier for a different batch; and (ii) replacing an existing classifier in the set for a given batch with a replacement classifier for the same batch.

16. A method according to claim 15, wherein the replacement classifier was trained on a larger group of items whose classification labels have been identified than was the existing enhancement classifier.

17. A method according to claim 15, wherein the replacement classifier is trained by assuming that at least one of the classification predictions generated by an existing classifier is usable in training as a ground truth label.

18. A computer-readable medium storing computer-executable program instructions for classifying items, the program instructions upon execution by one or more computers causing the one or more computers to:
(a) obtain initial feature sets of a current batch of items;
(b) generate classification predictions for the items based on the initial feature sets for the items, using a set of existing classifiers;
(c) append the classification predictions as additional features to the respective feature sets of the items, thereby obtaining enhanced feature sets;
(d) train a first classifier, using a plurality of the items as training samples and using the enhanced feature sets of the training samples; and
(e) classify items in the current batch using the enhanced feature sets of the items and the first classifier,
wherein at least one of the existing classifiers was trained on a different set of items that are representative of a corresponding different time.

19. A computer-readable medium according to claim 18, wherein the program instructions upon execution cause the one or more computers to further:
(f) train a second classifier using the initial feature sets, without enhancement, for the items in the current batch; and
(g) add the second classifier to the plurality of existing classifiers.

20. A computer-readable medium according to claim 18, wherein the program instructions upon execution cause the one or more computers to further:
(f) train a second classifier for the items in the current batch; and
(g) add the second classifier to the plurality of existing classifiers,
wherein the second classifier is trained on a larger subset of the items than was used to train the first classifier.

21. The method according to claim 13, wherein updating the set of classifiers comprises removing one or more classifiers in the set based on at least one criterion and adding the current classifier to the set.

22. The method according to claim 21, wherein performing the repeating in step (e) uses the updated set of classifiers.

23. The computer-readable medium according to claim 18, wherein the program instructions upon execution cause the one or more computers to further:
update the set of existing classifiers by removing one or more existing classifiers from the set and adding the first classifier to the set.

24. The computer-readable medium according to claim 23, wherein the program instructions upon execution cause the one or more computers to further repeat steps (b)-(e) using the updated set.

* * * * *